United States Patent [19]

Asbery

[11] Patent Number: 4,955,124
[45] Date of Patent: Sep. 11, 1990

[54] SHEATHED CUTTING MEANS APPARATUS AND METHOD

[76] Inventor: Ray Asbery, 1401 Mesa Park Dr., Round Rock, Tex. 78664

[21] Appl. No.: 394,273

[22] Filed: Aug. 15, 1989

Related U.S. Application Data

[63] Continuation of Ser. No. 118,060, Nov. 9, 1987, abandoned.

[51] Int. Cl.$^5$ .......................... B26B 7/00; B26B 29/00
[52] U.S. Cl. ............................. 29/426.4; 29/402.03; 30/371; 30/392
[58] Field of Search ............... 30/371, 373, 392, 286, 30/162; 29/428, 526 R, 426.4, 402.02, 402.03

[56] References Cited

U.S. PATENT DOCUMENTS

| | | | |
|---|---|---|---|
| 2,619,721 | 12/1952 | King | 30/371 |
| 2,722,244 | 11/1955 | Schultz | 30/371 X |
| 3,155,011 | 11/1964 | Hyskell | 30/371 X |
| 3,640,280 | 2/1972 | Slanker et al. | 30/392 X |
| 4,063,358 | 12/1977 | Hodge | 30/371 |
| 4,395,825 | 8/1983 | Lock | 30/277.4 |

Primary Examiner—Hien H. Phan
Attorney, Agent, or Firm—J. Nevin Shaffer, Jr.; Russell D. Culbertson

[57] ABSTRACT

A safe means for a cutting mechanism attachable to a remote power source and enclosed within a rigid semi-curved sheath. The sheathed cutting means of the invention is provided with a flexible power transmission means for connection to a remote power source. The flexible power transmission means is comprised of a two-ended blade, one end of which is connected to the power source and the other end of which is capable of acquiring a sharp edge. By means of the rigid slightly curved protective sheath, the blade can be introduced past the dash moldings and garnishings in a vehicle from the inside of the vehicle next to the interior window or windshield so that the cutting blade alone is brought into contact with the polyurethane seal and the seal is quickly and safely severed without breaking the windshield.

8 Claims, 1 Drawing Sheet

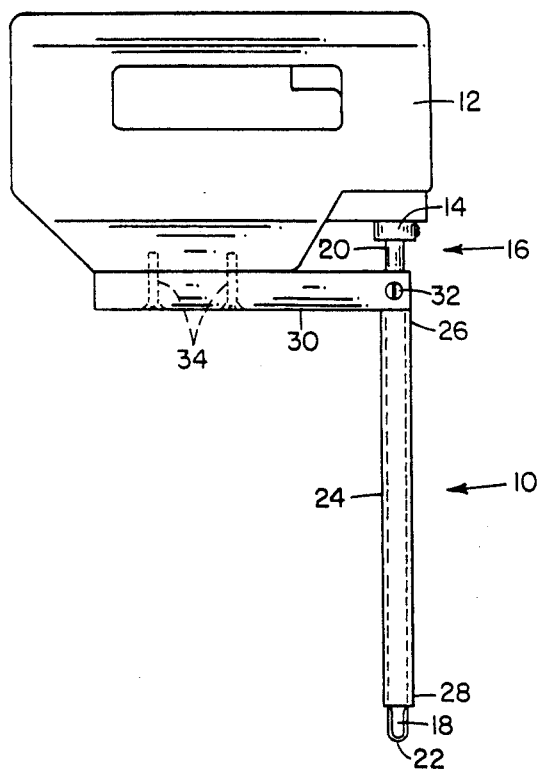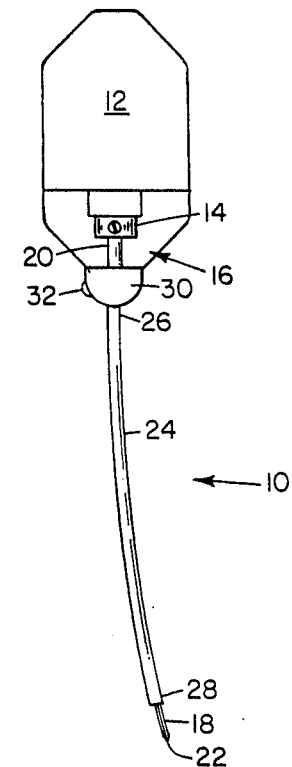
FIG. 1    FIG. 2
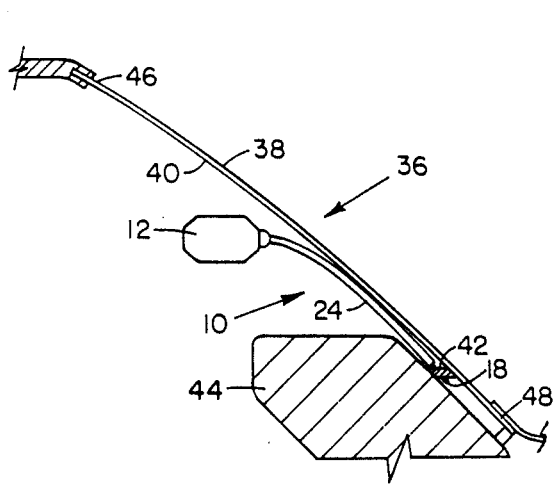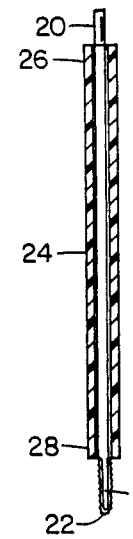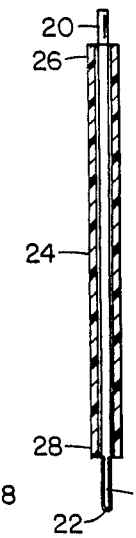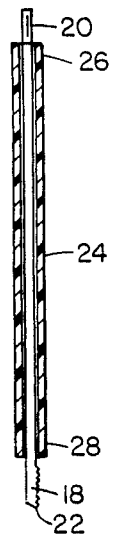
FIG. 3    FIG. 4A    FIG. 4B    FIG. 4C

SHEATHED CUTTING MEANS APPARATUS AND METHOD This application is a continuation of application Ser. No. 07/118,060, filed on Nov. 9, 1987, now abandoned.

BACKGROUND OF THE INVENTION

This invention relates to an improved sheathed cutting means for cutting seals around windows in vehicles.

Both manual and automatically driven cutting mechanisms have been known in the art for quite some time. In the automobile industry, the windshields and windows placed in vehicles are sealed by means of a urethane seal, in most cases. When, for whatever reason, it is desired to remove and/or replace a window in a vehicle, a variety of cutting mechanisms known in the art are employed. A product indicative of the state of the art in this regard is the "Fein AStlxe 636-5 Special Cutter" sold by Fein Power Tools, Inc. of Pittsburg, Pa. As advertised, this device "solves" problems encountered with removal of glass by means of long blades in a variety of configurations that oscillate from right to left without any up and down movement. Similar devices also are available. For instance, a "wild cat knife and blade pneumatic oscillating tool" is produced by C. R. Laurence Co., Inc. The company advertises the product as capable of cutting through hardened urethane with ease. Further, it is alleged that the blades from the Fein device fit the wild cat knife. These and all other tools known in the art designed for this purpose must urge the blade of the device around the bottom edge of the windshield in order to cut the urethane underneath the windshield. Often the urethane is too far away for blades to reach. Further, at the bottom corners of the windshield, the fenders of the automobile often block the use of the cut out tools known in the art. Often panels covering the bottom of the windshield must be removed in order to use the existing tools. Still further, often these tools can not be used at all because chrome moldings or other combination chrome and plastic moldings will not allow the blade to reach completely around the windshield. Each of these tools is designed to be utilized from the outside of the windshield with the blade reaching underneath the lip of the windshield in order to cut the urethane. The operator's ability to control the blade, which goes around the edge of the windshield and inside the car, is limited from the outside of the car and, as a result, interior moldings are often damaged. Additional damage is caused by the fact that the blades utilized in these inventions are rigid and are incapable of conforming to the curvature of the windshield as it cuts through the urethane. Further, the cut out blades known in the art are exposed over the length of the blade so that even those portions not in contact with the urethane are exposed and capable of damaging other parts of the vehicle unintentionally.

Thus, there is a need in the art for providing a sheathed cutting means with a flexible blade capable of conforming to the curvature of the windshield from which the urethane is being cut. Further, there is a need in the art for a cutting means capable of being utilized from the interior of the vehicle without the necessity of removing any parts of the dash molding or paneling. It, therefore, is an object of this invention to provide an improved cutting means for use in cutting urethane from windshields of vehicles from the interior of the vehicle by means of a sheathed flexible blade capable of conforming to the curvature of the windshield.

SHORT STATEMENT OF THE INVENTION

Accordingly, the sheathed cutting means of the present invention includes a power source, portable or otherwise, to which is attached a flexible cutting blade. One end of the flexible cutting blade is attached to the power source, and the opposite end is sharpened for cutting purposes. A rigid, slightly curved blade sheath is attached to the power source and conformed to just cover the blade. There is an opening in the tip of the rigid sheath through which a portion of the cutting blade protrudes, when driven by the power source for cutting, so that the cutting blade is exposed only where cutting is needed. Further, a mounting is provided to which the sheath may be easily attached and removed. The mounting and sheath can then be attached to the power source and removed at will. A variety of lengths of sheaths and cutting blades are provided depending upon the needs of the job.

BRIEF DESCRIPTION OF THE DRAWINGS

Other objects, features and advantages of the present invention will become more fully apparent from the following detailed description of the preferred embodiment, the appended claims and the a companying drawings in which:

FIG. 1 is a side view of a preferred embodiment of the sheathed cutting means of the present invention attached to a portable power source;

FIG. 2 is a front view of the slightly curved sheath attached to a mounting means with the blade located within the sheath;

FIG. 3 is a side view of the invention shown on the interior of a vehicle windshield in position for cutting a urethane seal; and FIGS. 4A–4C are side views of three embodiments the flexible cutting blade.

DETAILED DESCRIPTION OF THE PREFERRED EMBODIMENT

The preferred embodiment of the present invention is further illustrated by way example in FIGS. 1–4. With specific reference to FIGS. 1 and 2, the sheathed cutting means 10 includes power source 12 shown as a portable jig saw, but which may be of any fixed or portable power source known in the art. The primary requirement of the power source 12 is that it have a connection 14. Power transmission means 16, in the form of a flexible thin cutting blade 18, has a connection end 20. Connection end 20 is designed, in a manner commonly known in the art, to connect with power source connection 14 in a removably attachable manner. Cutting blade 18 also has the capability of being sharpened along its length. Nonetheless, in the present invention, cutting blade 18 is sharpened only along the tip 22, in a manner more fully discussed hereafter.

Also illustrated in FIGS. 1 and 2 is rigid sheath 24. Rigid sheath 24 is conformed to just fit around cutting blade 18 so that cutting blade 18 can move back and forth within sheath 24. Sheath 24 is constructed of any rigid matter, such as stainless steel, aluminum and even possibly PVC, or the like. The purpose of rigid sheath 24 is to serve as a guide and protector for cutting blade 18 and as a protector of any portion of the vehicle from contact with the moving blade 18.

As more clearly shown in FIG. 2, rigid sheath 24 has a slight curvature along its length from top 26 to bottom 28. This curvature is designed to allow power source 12 to be operated away from the windshield while work is being conducted while at the same time enabling cutting blade 18 to be directed in a direction conformable to the curvature of the windshield, as will be more fully discussed hereafter.

Removably attachable mounting 30 is designed to securely hold rigid sheath 24 in position by means of attachment 32, of any sort readily known in the art, shown here as a phillips-head screw. Because of this attachment 32, sheath 24 and mounting 30 form a unified whole which may be transported together and placed on a power source 12 as desired. Once sheath 24 is attached to mounting 30, mounting 30 in turn may be mounted to power source 12 by means of attachments 34, of a type commonly known in the art.

Referring now to FIG. 3, sheathed cutting means 10 is illustrated in use. FIG. 3 shows a side view of a vehicle windshield 36 with exterior side 38 and interior side 40. Also illustrated is seal 42, commonly of polyurethane but of any known seal in the art, connecting windshield 36 with the interior dash 44 of a vehicle. The top 46 of windshield 36, and bottom 48, are also shown. As shown in FIG. 3, device 10 is utilized from the interior of a vehicle. In use, the portable power supply power source 12 is capable of being held away from the interior side 40 of windshield 36 and, because of the curvature in rigid sheath 24, flexible thin cutting blade 18 can still be brought into proper position to cut seal 42.

FIG. 4A is a view of cutting blade 18 showing the cutting blade tip 22 formed with rip teeth on both sides of the blade.

FIG. 4B shows cutting blade 18 with a knife edge around the tip and FIG. 4C shows cutting blade 18 with saw teeth on one side only.

In use, sheathed cutting means 10 is utilized from inside the vehicle, as opposed to other devices known in the art. Utilizing cutting means 10 from the inside eliminates the necessity of removing parts from the car in order to bring the cutting blade 18 into cutting position on seal 42. A variety of similar blades of various lengths 18 may be utilized but in general the blades 18 are made, in the preferred embodiment, of 20,000ths inch thick, one-half inch wide, mild steel. Any suitable substitute that is firm yet flexible and capable of acquiring a sharp edge may be used. The blades 18 are sharpened only on the part of power transmission means 16 that extends out of sheath 24. In that regard, sheath 24, in the preferred embodiment, is produced in four inch, eight inch and fourteen inch sections. The blades 18 are made in different lengths so that they will extend out of each sheath 24 a desired cutting distance from one-quarter inch to one and one-half inches depending on the job. Of key importance is that by means of sheathed cutting means 10 automobile windshields may be removed after cutting urethane seal 42 from the inside of the vehicle, without the necessity of removing the dash or any other parts of the vehicle, and without breaking the glass. Prior to the advent of this invention, to the best of this inventor's knowledge, nobody in the autoglass industry had a tool such as this capable of removing the windshield this easily without breaking it. The prior tools require that the cutting instrument approach seal 42 from the bottom 48 of windshield 36. This approach runs afoul of various moldings and frame members which must be removed in order for a complete cut to be attempted. Still, often the cut is not capable of being made completely and resort to breaking the windshield must be taken.

As shown in the illustrations, blade 16 has most of its length contained within sheath 24. The advantage of sheath 24 is that it serves as a guide for blade 18 and a protector of dash 44 and any other parts of the vehicle with which the blade might come in contact. As a result of this construction, the tip>or cutting portion 22 of blade 18, reciprocating in and out of the end of sheath 24 only the desired cutting distance, is the only portion of the blade that comes in contact with seal 42. Also best illustrated in FIG. 3, the sheath end cannot be inserted through the urethane seal 42 through the opening made by the thinner blade tip or cutting portion 22 and thus prevents the cutting portion from cutting through the seal material more than the desired cutting distance.

A further advantage of the invention is the fact that because cutting blade 18 is flexible, it also will conform to the curvature of windshield 36 and cut through seal 42 without causing damage to window 36.

The total width of sheath 24 and blade 18 is less than one-eighth inch. This very narrow width allows sheath 24 with blade 18 to go between the windshield 36 and dash 44. Further, the narrowness of sheath 24 and blade 18 enables them to slide easily under any garnish moldings of the vehicle.

As a result of this invention, sheathed cutting means 10 can be used to remove windshields, quarter glasses, back glasses or any motor vehicle part held in place by a urethane, polyurethane or polyurethane type adhesive. The device may be used from the interior of the windshield without damage to the dash or garnish moldings of the vehicle. As a result, a tremendous increase in ability to remove a wide variety of domestic and foreign windshields is provided. Further, a tremendous time savings is provided by the use of the present invention. The device is inexpensive to manufacture and easy to use. It is also safe in that only a small portion of the moving blade is exposed and only to the working surface. Thus, the cutting mechanism of the present invention has the important advantage of providing a safe means of accomplishing a previously difficult task.

While the present invention has been disclosed in connection with the preferred embodiment thereof, it should be understood that there may be other embodiments which fall within the spirit and scope of the invention as defined by the following claims.

What is claimed:

1. A method for cutting the seal positioned around a vehicle window between the inside surface of the window and the vehicle structure, said method comprising the steps of:

(a) providing a flexible elongated power transmission member having a first end and a second end, the second end including a cutting portion adapted for cutting the seal between the window and the vehicle structure;

(b) completely encasing the power transmission member with a slightly curved sheath over substantially its entire length, the sheath having an open end through which the cutting portion of the power transmission member is adapted to extend a desired cutting distance;

(c) inserting the open end of the sheath, along with the substantially covered power, transmission member into the space between the inner surface of the window and the vehicle structure to the seal; and (d) reciprocating the power transmission member in the sheath so that the cutting portion of power transmission member reciprocates back and forth out of the open end of the sheath to the desired cutting distance to cut the seal without substantially damaging the vehicle structure adjacent the window.

2. The method of claim 1 further comprising the steps of:

(a) removably attaching the first end of the power transmission member to a power source for reciprocating the power transmission member;

(b) removably attaching a sheath to the power source; and (c) removably attaching the sheath to the sheath mounting over the power transmission member.

3. A cutting apparatus for cutting the seal positioned around a vehicle window between the surface of the window and the vehicle structure, said cutting apparatus comprising:

(a) an elongated and flexible power transmission member;

(b) power means connected to a first end of the power transmission member for reciprocating the power transmission member along its longitudinal axis;

(c) a cutting portion on a second end of the power transmission member adapted for cutting the seal material between the window and the vehicle structure;

(d) an elongated sheath removably attached at one end to the power means and adapted to cover the power transmission member along substantially its entire length; and (e) an open sheath end, opposite the end removably attached to the power means, through which the cutting portion of the power transmission member is adapted to extend a desired cutting distance as the power means reciprocates the power transmission member, the open sheath end being adapted to be positioned adjacent to the seal material so as to prevent the cutting portion from cutting through the seal material more than the desired cutting distance.

4. The cutting apparatus of claim 3 wherein the sheath is adapted to fully enclose the flexible power transmission member along substantially its entire length.

5. The cutting apparatus of claim 3 wherein the sheath is curved so as to conform substantially to the curvature of the vehicle window and to enable the power means to be spaced from the window surface when the open sheath end is inserted to the seal.

6. The cutting apparatus of claim 3 further comprising mounting means removably attached to the power means for removably attaching the sheath to the power means over the power transmission member.

7. The cutting apparatus of claim 3 wherein the power transmission member further comprises:

(a) a flat piece of material capable of acquiring a sharp edge and being adapted to flex as it is reciprocated through the sheath;

(b) a connector at the first end adapted to removably attach the first end to the power means; and (c) a sharp edge on the cutting portion of the power transmission member.

8. The apparatus of claim 7 wherein the sheath is substantially flat with a passage therethrough to just accommodate insertion and reciprocation of the flat power transmission member.

* * * * *